(12) United States Patent
Murashi et al.

(10) Patent No.: US 9,325,031 B2
(45) Date of Patent: Apr. 26, 2016

(54) BATTERY

(71) Applicant: KABUSHIKI KAISHA TOSHIBA, Minato-ku (JP)

(72) Inventors: Yasuaki Murashi, Kashiwazaki (JP); Hidetoshi Watanabe, Kashiwazaki (JP); Koji Takazawa, Kashiwazaki (JP); Yoshinao Tatebayashi, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 137 days.

(21) Appl. No.: 14/190,309

(22) Filed: Feb. 26, 2014

(65) Prior Publication Data
US 2014/0242466 A1    Aug. 28, 2014

(30) Foreign Application Priority Data

Feb. 28, 2013    (JP) ................................. 2013-039879

(51) Int. Cl.
*H01M 10/0525* (2010.01)
*H01M 4/485* (2010.01)
*H01M 4/505* (2010.01)
*H01M 4/525* (2010.01)

(52) U.S. Cl.
CPC .......... *H01M 10/0525* (2013.01); *H01M 4/485* (2013.01); *H01M 4/505* (2013.01); *H01M 4/525* (2013.01); *Y02E 60/122* (2013.01)

(58) Field of Classification Search
CPC . H01M 10/0525; H01M 4/485; H01M 4/505; H01M 4/525
See application file for complete search history.

(56) References Cited

U.S. PATENT DOCUMENTS

| 5,084,366 | A | 1/1992 | Toyoguchi |
| 6,534,216 | B1 * | 3/2003 | Narukawa .......... G01G 45/1242 29/623.1 |
| 2004/0018431 | A1 | 1/2004 | Gozdz et al. |
| 2005/0064282 | A1 | 3/2005 | Inagaki et al. |

(Continued)

FOREIGN PATENT DOCUMENTS

| CN | 1175099 A | 3/1998 |
| CN | 101339992 A | 1/2009 |

(Continued)

OTHER PUBLICATIONS

Extended European Search Report issued Jun. 25, 2014 in Patent Application No. 14156964.0.

(Continued)

*Primary Examiner* — Stewart Fraser
(74) *Attorney, Agent, or Firm* — Oblon, McClelland, Maier & Neustadt, L.L.P.

(57) ABSTRACT

According to one embodiment, there is provided a battery including a positive electrode, and a negative electrode. The positive electrode contains a lithium-cobalt composite oxide and a lithium-manganese composite oxide. The negative electrode contains a lithium titanium composite oxide. The battery satisfies the following formula (1). In addition, an open circuit voltage (OCV) of the positive electrode when the battery is discharged to 1.8 V at 0.2 C is 3.6 V (Li v.s. $Li^+$) or more.

$$(Qp/Qn) > 1.1 \qquad (1)$$

Qp is a charge capacity ($mAh/m^2$) of the positive electrode per unit area, and Qn is a charge capacity ($mAh/m^2$) of the negative electrode per unit area.

12 Claims, 4 Drawing Sheets

(56) References Cited

U.S. PATENT DOCUMENTS

| | | |
|---|---|---|
| 2006/0046155 A1 | 3/2006 | Inagaki et al. |
| 2006/0147795 A1 | 7/2006 | Li et al. |
| 2006/0222947 A1 | 10/2006 | Sun et al. |
| 2008/0311470 A1 | 12/2008 | Gozdz et al. |
| 2010/0143790 A1 | 6/2010 | Inagaki et al. |
| 2011/0020699 A1* | 1/2011 | Inagaki ............... C01G 23/005 429/181 |
| 2011/0053004 A1* | 3/2011 | Saruwatari ........... H01M 4/131 429/342 |
| 2011/0076557 A1* | 3/2011 | Ishii .................... B60L 3/0046 429/199 |
| 2012/0214056 A1 | 8/2012 | Gozdz et al. |

FOREIGN PATENT DOCUMENTS

| | | |
|---|---|---|
| CN | 102035028 A | 4/2011 |
| EP | 0 390 185 A2 | 10/1990 |
| JP | 2006-54167 | 2/2006 |

OTHER PUBLICATIONS

Combined Chinese Office Action and Search Report issued Sep. 25, 2015 in Patent Application No. 201410070580.1 (with English language translation).

* cited by examiner

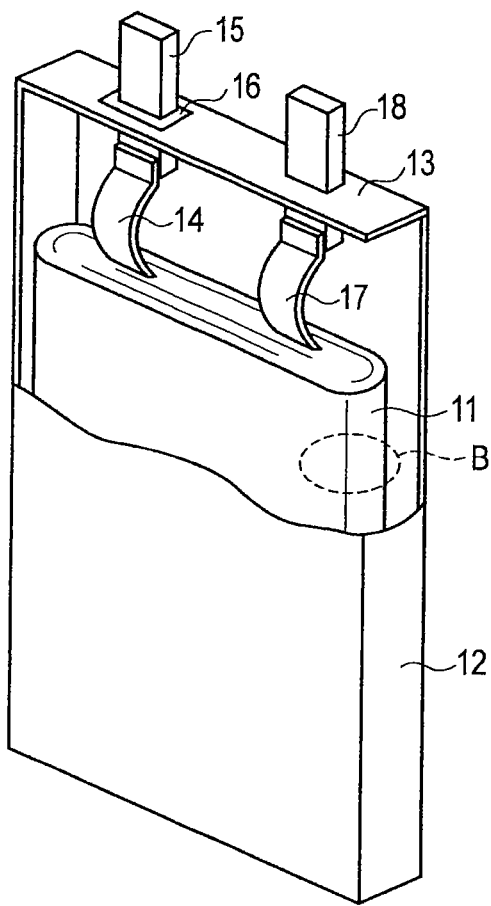
F I G. 3
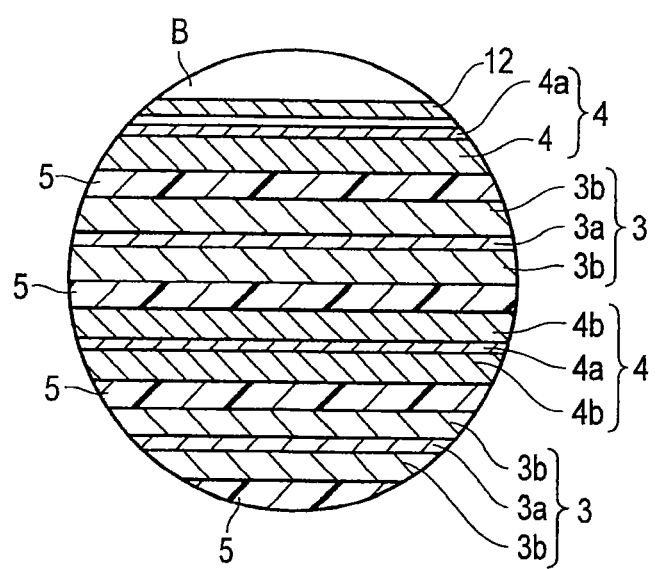
F I G. 4

BATTERY

CROSS-REFERENCE TO RELATED APPLICATIONS

This application is based upon and claims the benefit of priority from Japanese Patent Application No. 2013-039879, filed Feb. 28, 2013, the entire contents of which are incorporated herein by reference.

FIELD

Embodiments described herein relate generally to a battery.

BACKGROUND

With the rapid development of techniques for miniaturizing electronics instruments, various mobile electronic devices are becoming pervasive. In recent years, batteries are used as the power sources for mobile bodies such as automobiles, so that batteries having a long life and high safety are demanded.

With the intention of reducing the capacity deterioration caused by the battery use, the capacity of the positive electrode was made greater than that of the negative electrode. However, the capacity deterioration caused by the increase in resistance during the charge and discharge cycle was not improved. Therefore, the capacity deterioration caused by the increase in resistance must be solved.

BRIEF DESCRIPTION OF THE DRAWINGS

FIG. 3 is a partially cutaway perspective view showing an example of the battery according to the embodiment;

FIG. 4 is an enlarged cross-sectional view showing the part indicated with B in FIG. 3;

DETAILED DESCRIPTION

Figure 1:
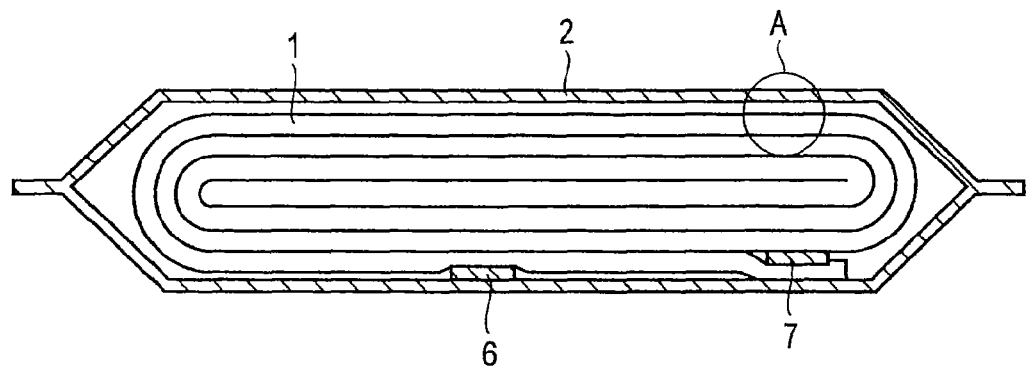
FIG. 1 is a cross-sectional schematic view showing an example of the battery according to the embodiment.

According to one embodiment, a battery including a positive electrode, a negative electrode, and a nonaqueous electrolyte is provided. The positive electrode contains a lithium-cobalt composite oxide and a lithium-manganese composite oxide. The negative electrode contains a lithium titanium composite oxide. The battery satisfies the following formula (1). In addition, the open circuit voltage (OCV) of the positive electrode when the battery is discharged to 1.8 V at 0.2 C is 3.6 V (Li v.s. Li$^+$) or more.

$$(Qp/Qn) > 1.1 \tag{1}$$

Qp is the charge capacity (mAh/m$^2$) of the positive electrode per unit area, and Qn is the charge capacity (mAh/m$^2$) of the negative electrode per unit area. The charge capacities Qp and Qn are the values when the charge and discharge range of the positive electrode is from 3.0 to 4.25 V (Li v.s. Li$^+$), and the charge and discharge range of the negative electrode is from 1.4 to 2.0 V (Li v.s. Li$^+$).

The embodiments are described below with reference to drawings. Through the embodiments, the same structures are denoted by the same reference numerals, and overlapping explanations thereof are omitted. The following figures show schematic views for helping the explanation and understanding of the embodiments. The shape, dimension, and ratio may be different from those in an actual apparatus, and may be designed and changed in consideration of the following explanations and known techniques.

According to the embodiment, a battery including a positive electrode, a negative electrode, and a nonaqueous electrolyte is provided. The positive electrode contains a lithium-cobalt composite oxide and a lithium-manganese composite oxide. The negative electrode contains a lithium titanium composite oxide. The battery satisfies the following formula (1). In addition, the open circuit voltage (OCV) of the positive electrode is 3.6 V (Li v.s. Li$^+$) or more when the battery is discharged to 1.8 V at 0.2 C.

$$(Qp/Qn) > 1.1 \tag{1}$$

Qp is the charge capacity (mAh/m$^2$) of the positive electrode per unit area, and Qn is the charge capacity (mAh/m$^2$) of the negative electrode per unit area. The charge capacities Qp and Qn are the values when the charge and discharge range of the positive electrode is from 3.0 to 4.25 V (Li v.s. Li$^+$), and the charge and discharge range of the negative electrode is from 1.4 to 2.0 V (Li v.s. Li$^+$). Each of the areas of the positive and negative electrodes is the area of the active material-containing layer on one side of the collector.

The charge and discharge efficiency of the positive electrode containing a lithium-cobalt composite oxide as an active material is lower than that of the negative electrode containing a lithium titanium composite oxide as an active material. Therefore, in the nonaqueous electrolyte battery including the positive and negative electrodes, the end of discharge depends on the change in the positive electrode potential, so that the positive electrode tends to be overdischarged, and the positive electrode active material will quickly deteriorate. The charge and discharge efficiency of the positive electrode is increased to almost the same level with that of the negative electrode by mixing the lithium-cobalt composite oxide with a lithium-manganese composite oxide, which achieves a higher charge and discharge efficiency than a lithium-cobalt composite oxide, but the end of discharge is influenced by the changes in potentials of both of the positive and negative electrodes, which makes it difficult to prevent overdischarge of the positive electrode.

The battery according to the embodiment satisfies the formula (1). The charge capacities Qp and Qn in the formula (1) are the charge capacities of the active material-containing layer per unit area within the potential range of the charge and discharge of the positive and negative electrodes, and thus are substantial charge capacities usable for the charge and discharge reaction. When (Qp/Qn)>1.1, the end of discharge is determined by the change in the voltage of the negative electrode by making the open circuit voltage (OCV) of the positive electrode 3.6 V (Li v.s. Li$^+$) or more when the battery is discharged to 1.8 V at 0.2 C, whereby overdischarge of the positive electrode is prevented. As a result of this, deterioration of the lithium-cobalt composite oxide is suppressed, whereby the increase in resistance during the charge and discharge cycle is suppressed, and the capacity retention rate is improved. In addition, overcharge of the positive electrode is prevented because (Qp/Qn)>1.1, and the occurrence of dendrite on the negative electrode during overcharge is suppressed, whereby safety is improved. Accordingly, a battery having a long life and high safety is provided.

If the (Qp/Qn) is 1.1 or less, the positive electrode charge capacity within the potential range of charge and discharge is deficient, so that the open circuit voltage (OCV) of the positive electrode when the battery is discharged to 1.8 V at 0.2 C becomes less than 3.6 V (Li v.s. Li$^+$), and the positive electrode is overdischarged. In addition, when the (Qp/Qn) is 1.1 or less, lithium dendrite easily occurs on the negative electrode during overcharging. The upper limit of the (Qp/Qn) is preferably 1.7. When the (Qp/Qn) is 1.7 or less, a high battery capacity is achieved, and the decrease in the heat radiation from the electrode group caused by the increase of the positive electrode thickness is avoided, whereby high safety is achieved.

The upper limit of the open circuit voltage (OCV) of the positive electrode is preferably 3.9 V (Li v.s. Li$^+$). When the open circuit voltage (OCV) of the positive electrode is 3.9 V (Li v.s. Li$^+$) or less, the positive electrode potential to be used falls within an appropriate range, and the deterioration in the overcharge characteristic is avoided.

The open circuit voltage of the positive electrode can be determined as follows: the battery is discharged to 1.8 V at 0.2 C, the positive and negative electrodes are separated from the battery in an argon atmosphere, and the potential of the positive electrode taken out is measured.

The battery according to the embodiment further includes, in addition to the positive and negative electrodes and nonaqueous electrolyte, a separator placed between the positive and negative electrodes, and a case member for housing them.

The nonaqueous electrolyte, positive and negative electrodes, separator, and exterior member are further described below.

1) Nonaqueous Electrolyte

Examples of the nonaqueous electrolyte include a liquid nonaqueous electrolyte prepared by dissolving an electrolyte in a nonaqueous solvent, and a gelatinous nonaqueous electrolyte prepared by complexing a liquid nonaqueous electrolyte with a polymer material.

Examples of the electrolyte include lithium salts such as lithium perchlorate (LiClO$_4$), Lithium hexafluorophosphate (LiPF$_6$), lithium tetrafluoroborate (LiBF$_4$), lithium hexafluoroarsenate (LiAsF$_6$), lithium trifluorometasulfonate (LiCF$_3$SO$_3$), or lithium bistrifluoromethylsulfonylimide [LiN(CF$_3$SO$_2$)$_2$]. These electrolytes may be used alone or in combination of two or more thereof.

The electrolyte is preferably dissolved in an organic solvent at a concentration of 0.5 to 2.5 mol/L.

Examples of the nonaqueous solvent include cyclic carbonates such as ethylene carbonate (EC), propylene carbonate (PC), or vinylene carbonate (VC); chain carbonates such as dimethylcarbonate (DMC), methylethyl carbonate (MEC), or diethyl carbonate (DEC); cyclic ethers such as tetrahydrofuran (THF) or 2-methyltetrahydrofuran (2-MeTHF); chain ethers such as dimethoxy ethane (DME); γ-butyrolactone (BL); acetonitrile (AN); and sulfolane (SL). These organic solvents may be used alone or in combination of two or more thereof.

Examples of the polymer material used in the gelatinous nonaqueous electrolyte include polyvinylidene fluoride (PVdF), polyacrylonitrile (PAN), and polyethylene oxide (PEO).

2) Positive Electrode

The positive electrode includes a positive electrode collector, and a positive electrode active material-containing layer (positive electrode material layer) which is supported on one side or both sides of the positive electrode collector, and contains a positive electrode active material, a positive electrode conductive agent, and a binder.

The positive electrode active material contains a lithium-cobalt composite oxide and a lithium-manganese composite oxide. Examples of the lithium-cobalt composite oxide include Li$_x$CoO$_2$ (0<x≤1.1). Examples of the lithium-manganese composite oxide include Li$_x$Mn$_2$O$_4$ (0<x≤1.1), and Li$_x$MnO$_2$ (0<x≤1.1).

In order to sufficiently improve the charge and discharge efficiency of the positive electrode by the lithium-manganese composite oxide, the amount of the lithium-manganese composite oxide is preferably higher than that of the lithium-cobalt composite oxide. When the positive electrode active material substantially comprises a lithium-cobalt composite oxide and a lithium-manganese composite oxide, the amount of the lithium-manganese composite oxide is preferably higher than 50% by weight. More preferred range of the amount of the lithium-manganese composite oxide is from 70 to 99% by weight, and that of the amount of lithium-cobalt composite oxide is from 1 to 30% by weight.

The positive electrode active material may contain an active material other than the lithium-cobalt composite oxide and lithium-manganese composite oxide.

Examples of the binder include polytetrafluoroethylene (PTFE), polyvinylidene fluoride (PVdF), fluorine rubber, styrene-butadiene rubber (SBR), carboxymethyl cellulose (CMC), polyimide, and polyamide.

Examples of the positive electrode conductive agent include acetylene black, carbon black, graphite, carbon fiber, carbon nanotube, and fullerene.

The proportions of the positive electrode active material, conductive agent, and binder are preferably from 80 to 95% by weight for the positive electrode active material, from 3 to 18% by weight for the conductive agent, and from 2 to 17% by weight for the binder.

The collector is preferably aluminum foil or aluminum alloy foil, and its average crystal grain diameter is 50 μm or less, more preferably 30 μm or less, and even more preferably 5 μm or less. The collector made of aluminum foil or aluminum alloy foil with the average crystal grain diameter has a high strength, so that allows the increase of the positive electrode density under a high pressing pressure, whereby the battery capacity is increased.

The aluminum foil or aluminum alloy foil with an average crystal grain diameter of 50 μm or less is complicatedly influenced by many factors such as the constitution of the material, impurities, processing conditions, heat treatment history, and heating conditions during annealing. The crystal grain diameter is adjusted by the combination of these factors in the manufacturing process.

The thickness of the collector is 20 μm or less, and more preferably 15 μm or less. The purity of the aluminum foil is preferably 99% or more. The aluminum alloy is preferably an alloy containing magnesium, zinc, silicon, or other element. The content of the transition metal such as iron, copper, nickel, or chromium is preferably 1% or less.

The positive electrode is made by, for example, suspending a positive electrode active material, a positive electrode conductive agent, and a binder in an appropriate solvent to make a slurry, applying the slurry to a positive electrode collector, drying the coating to make a positive electrode active material-containing layer, and then pressing the collector. Alternatively, the positive electrode active material, positive electrode conductive agent, and binder may be formed into pellets, and used as the positive electrode active material-containing layer.

The positive electrode density is preferably 2.8 g/cc or more.

3) Negative Electrode

The negative electrode includes a negative electrode collector and a negative electrode active material-containing layer which is supported on one side or both sides of negative electrode collector, and contains a negative electrode active material, a negative electrode conductive agent, and a binder.

The negative electrode active material contains a lithium titanium composite oxide. The lithium titanium composite oxide may include lithium titanium oxide, and lithium titanium composite oxide including another element other than Li, Ti and O. Examples of the lithium titanium oxide include spinel lithium titanate (for example, $Li_{4+x}Ti_5O_{12}$, wherein x is a value variable by charge and discharge, and $0 \leq x \leq 3$), and ramsdellite lithium titanate (for example $Li_{2+y}Ti_3O_7$, wherein y is value variable by charge and discharge, and $0 \leq y \leq 3$). The molar ratio of oxygen is nominally defined as 12 for spinel $Li_4Ti_5O_{12}$, and 7 for ramsdellite $Li_2Ti_3O_7$, but these values can be change by, for example, the influence of oxygen non-stoichiometry.

The negative electrode active material may be one or more.

The negative electrode containing a lithium titanium composite oxide has an Li absorbing potential of 0.4 V (vs. Li/Li$^+$) or more, so that it prevents the deposition of metal lithium on the negative electrode surface during repetition of input and output at a large current. The negative electrode active material may contain an active material other than a lithium titanium composite oxide. In this case, the active material preferably has an Li absorbing potential of 0.4 V (vs. Li/Li$^+$) or more.

Examples of the binder include polytetrafluoroethylene (PTFE), polyvinylidene fluoride (PVdF), fluorine rubber, styrene-butadiene rubber (SBR), carboxymethyl cellulose (CMC), polyimide, and polyamide.

Examples of the negative electrode conductive agent include acetylene black, carbon black, graphite, carbon fiber, carbon nanotube, and fullerene.

The proportions of the negative electrode active material, conductive agent, and binder are preferably from 70 to 96% by weight for the negative electrode active material, from 2 to 28% by weight for the conductive agent, and from 2 to 28% by weight for the binder. When the proportion of the conductive agent is 2% by weight or more, large current characteristic owing to high current collection performance is achieved. When the proportion of the binder is 2% by weight or more, high cycling characteristic is achieved owing to the high binding between the negative electrode active material-containing layer and the negative electrode collector. In order to achieve a high capacity, the upper limit of the proportions of the negative electrode conductive agent and binder is preferably 28% by weight.

The collector is preferably aluminum foil or aluminum alloy foil which is electrochemically stable in the potential range higher than 1.0 V.

The negative electrode is made by, for example, suspending a negative electrode active material, a negative electrode conductive agent, and a binder in an appropriate solvent to make a slurry, applying the slurry to a negative electrode collector, drying the coating to make a negative electrode active material-containing layer, and then pressing the collector. Alternatively, the negative electrode active material, negative electrode conductive agent, and binder may be formed into pellets, and used as the negative electrode active material-containing layer.

The negative electrode density is preferably 2 g/cc or more.

4) Separator

Examples of the separator include porous film and non-woven fabric made of a synthetic resin containing polyethylene, polypropylene, cellulose, or polyvinylidene fluoride (PVdF).

5) Case Member

The case member may be formed from a laminate film having a thickness of 0.2 mm or less, or comprise a metal container having a wall thickness of 0.5 mm or less. When a metal container is used, the lid may be integral with or separate from the container. The wall thickness of the metal container is more preferably 0.2 mm or less. Examples of the shape include flat, rectangular, cylinder, coin, button, sheet, and laminate. Needless to say, the battery may be a compact battery mounted on mobile electronic devices, or a large battery mounted on two-four-wheel automobiles.

The laminate film used herein is a multilayer film comprising a metal layer provided between resin film layers. The metal layer is preferably aluminum foil or aluminum alloy foil, thereby reducing the weight. The resin film may be, for example, a polymer material such as polypropylene (PP), polyethylene (PE), nylon, or polyethylene terephthalate (PET). The laminate film may be heat-sealed to be formed into the shape of a case member.

The metal container is made of aluminum or an aluminum alloy. The aluminum alloy preferably contains an element such as magnesium, zinc, or silicon. In the aluminum or aluminum alloy, the content of the transition metal such as iron, copper, nickel, or chromium is preferably 100 ppm or less, thereby markedly achieving the long-term reliability and heat radiation in high temperature environments.

The average crystal grain diameter of the metal container made of aluminum or an aluminum alloy is 50 μm or less, more preferably 30 μm or less, and even more preferably 5 μm or less. When the average crystal grain diameter is 50 μm or less, the metal container made of aluminum or an aluminum alloy has a high strength, which allows further reduction of the wall thickness of the container. As a result of this, achieved is a nonaqueous electrolyte battery which has a light weight, a high power, and long-term reliability, and is suitable for mounting in automobiles.

Since the battery according to the embodiment has a long life and high safety, it is particularly suitable as an onboard battery.

In the battery according to the embodiment, the (Qp/Qn) can be adjusted by adjusting the thickness of the slurry applied to the collector during manufacture of the positive and/or negative electrode. The charge and discharge efficiency of the positive and negative electrodes is influenced by the type of the active material. Therefore, the charge and discharge efficiencies of the positive and negative electrode are almost the same in the nonaqueous electrolyte battery including a lithium-cobalt composite oxide and a lithium-manganese composite oxide as positive electrode active materials, and a lithium titanium composite oxide as a negative electrode active material, whereby the end of discharge of the battery is determined by the changes in voltages of both of the positive and negative electrodes. The inventors have made the following finding: when the state of charge (SOC) of the positive electrode is greater than the state of charge (SOC) of the negative electrode, the terminal voltage of discharge can be determined by the change in the voltage of the negative electrode even though the charge and discharge efficiencies of the positive and negative electrodes are almost the same, so that the open circuit voltage (OCV) of the positive electrode can be increased to 3.6 V (Li v.s. Li$^+$) or more when the battery is discharged to 1.8 V at 0.2 C. The state of charge (SOC) 100% is the charge capacity after constant current/constant voltage charging (CC/CV charging), wherein the battery is charged to 2.8 V at a constant current of 1 C, and then charged at a constant voltage of 2.8 V until the current becomes 0.05 C.

An example of the battery according to the embodiment is explained with reference to FIGS. 1 and 2. As shown in FIG. 1, the flat nonaqueous electrolyte secondary battery include a wound electrode group 1 in a flat form, a case member 2, a positive electrode terminal 7, a negative electrode terminal 6, and a nonaqueous electrolyte.

The case member 2 is in the form of a bag made of a laminate film. The wound electrode group 1 is housed in the case member 2. As shown in FIG. 2, the wound electrode group 1 includes a positive electrode 3, a negative electrode 4, and a separator 5, and is formed by spiraling a laminate which includes, from the outside to the inside, the negative electrode 4, the separator 5, the positive electrode 3, and the separator 5, and then press-forming the spiral.

The positive electrode 3 includes a positive electrode collector 3a and a positive electrode active material-containing layer 3b. The positive electrode active material-containing layer 3b contains a positive electrode active material. The positive electrode active material-containing layer 3b is formed on both sides of the positive electrode collector 3a.

The negative electrode 4 includes a negative electrode collector 4a and a negative electrode active material-containing layer 4b. The negative electrode active material-containing layer 4b contains a negative electrode active material. On the outermost layer of the negative electrode 4, the negative electrode active material-containing layer 4b is formed only on one inner side of the negative electrode collector 4a, and the negative electrode active material-containing layer 4b is formed on both sides of the negative electrode collector 4a on other parts.

Figure 2:
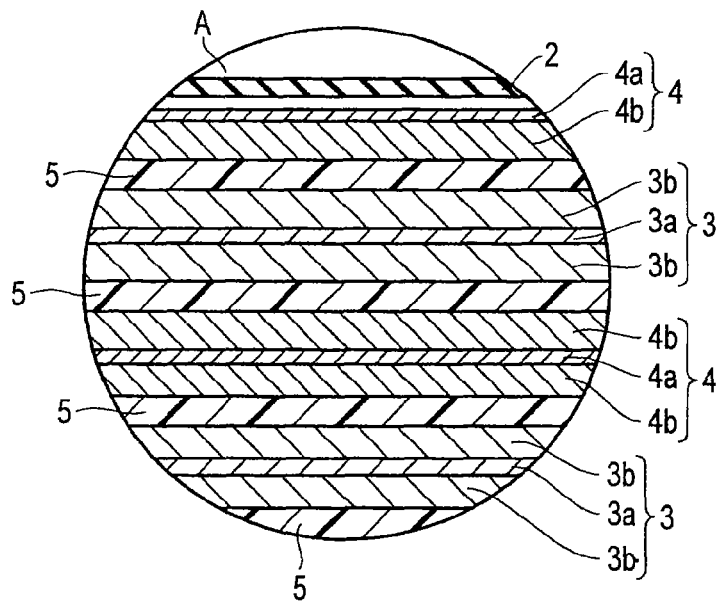
FIG. 2 is an enlarged cross-sectional view showing the part indicated with A in FIG. 1.

As shown in FIG. 2, the positive electrode terminal 7 in a strip form is connected to the positive electrode collector 3a of the positive electrode 3 in the vicinity of the outer peripheral edge of the wound electrode group 1. In addition, the negative electrode terminal 6 in a strip form is connected to the negative electrode collector 4a of the negative electrode 4 in the outermost layer. The positive electrode terminal 7 and the negative electrode terminal 6 extend to the outside through the opening of the case member 2. A nonaqueous electrolyte solution is injected into the inside of the case member 2. The opening of the case member 2 is heat-sealed with the positive electrode terminal 7 and the negative electrode terminal 6 provided therebetween, thereby sealing the wound electrode group 1 and the nonaqueous electrolyte.

The battery according to the embodiment is not limited to the structure shown in FIGS. 1 and 2, and may have a structure shown in FIGS. 3 and 4. The same members as those shown in FIGS. 1 and 2 are denoted by the same reference numerals, and explanations thereof are omitted.

In the rectangular nonaqueous electrolyte battery shown in FIG. 3, a wound electrode group 11 is housed in a bottomed rectangular tubular container (case member) 12 made of metal. The nonaqueous electrolyte solution (liquid nonaqueous electrolyte) is injected from, for example, the opening of a container 12, and housed in the container 12. A rectangular lid body 13 is welded to the opening of the container 12, whereby the wound electrode group 11 and the nonaqueous electrolyte solution are sealed in the case member.

As shown in FIG. 4, the wound electrode group 11 in a flat form is formed by spiraling a laminate which includes, from the outside to the inside, a negative electrode 4, a separator 5, a positive electrode 3, and a separator 5, and then press-forming the spiral.

A negative electrode tab 14 is electrically connected to a negative electrode collector 4a at one end, and the other end is electrically connected to a negative electrode terminal 15. The negative electrode terminal 15 is fixed on the rectangular lid body 13 by hermetic seal with a glass material 16 intervened therebetween. A positive electrode tab 17 is electrically connected to a positive electrode collector 3a at one end, and the other end is electrically connected to a positive electrode terminal 18 which is fixed on the rectangular lid body 13.

The negative electrode tab 14 is made of, for example, aluminum or an aluminum alloy containing Mg, Ti, Zn, Mn, Fe, Cu, Si, or other element. The negative electrode tab 14 is preferably made of the same material as the negative electrode collector, thereby reducing contact resistance to the negative electrode collector.

The positive electrode tab 17 is made of, for example, aluminum or an aluminum alloy containing Mg, Ti, Zn, Mn, Fe, Cu, Si, or other element. The positive electrode tab 17 is preferably made of the same material as the positive electrode collector, thereby reducing the contact resistance to the positive electrode collector.

The nonaqueous electrolyte battery shown in the figures includes a wound electrode group made by winding a separator together with positive and negative electrodes. Alternatively, a laminate electrode group made by zigzag-folding the separator, and alternately placing the positive and negative electrodes in the folded sections.

The battery according to the embodiment explained above satisfies the formula (1) ((Qp/Qn)>1.1), the open circuit voltage (OCV) of the positive electrode when the battery is discharged to 1.8 V at 0.2 C is 3.6 V (Li v.s. Li$^+$) or more, so that overdischarge of the positive electrode is prevented, and the occurrence of dendrite on the negative electrode during overcharge is suppressed. Therefore, a battery having a long life and high safety is provided.

EXAMPLES

The examples are described below, but the present embodiments will not be limited to these examples without departing from the scope of the present embodiments.

The methods for making the nonaqueous electrolyte secondary batteries of the examples and comparative examples are described below.

Comparative Example 1

<Making of Positive Electrode>

As the positive electrode active materials, 80% by weight of lithium-manganese oxide (LiMn$_2$O$_4$) powder and 20% by weight of lithium-cobalt oxide (LiCoO$_2$) powder were provided. The positive electrode active materials, 2% by weight of acetylene black, 2% by weight of graphite, and 3% by weight of polyvinylidene fluoride (PVdF) were added to and mixed with N-methylpyrrolidone (NMP), and thus preparing a slurry. The slurry was applied to both sides of the collector, which is made of aluminum foil having a thickness of 15 μm and an average grain diameter of 30 μm, at the thickness shown in Table 1. And then the collector was dried and pressed, thereby making a positive electrode having a long side of 3800 mm and a short side of 73 mm.

<Making of Negative Electrode>

Spinel lithium titanate expressed by $Li_4Ti_5O_{12}$ having an Li absorbing potential of 1.55 V (vs. $Li/Li^+$) was provided as a negative electrode active material. 91% by weight of the negative electrode active material, 5% by weight of graphite as a conductive material, and 4% by weight of polyvinylidene fluoride (PVdF) were added to and mixed with N-methylpyrrolidone (NMP), and thus preparing a slurry. The slurry was applied to both sides of a collector, which is made of aluminum foil having a thickness of 15 μm and an average grain diameter of 30 μm, at the thickness shown in Table 1. And the collector was dried and pressed, thereby making a negative electrode having a long side of 3900 mm and a short side of 78 mm.

<Making of Electrode Group>

A positive electrode, a separator made of a cellulose porous film having a thickness of 15 μm, a negative electrode, and a separator were laminated in this order, and spiraled. The spiral was heat-pressed at about 120° C., thereby making an electrode group. The electrode group thus obtained was housed in a case member, and dried for 8 hours under vacuum at about 95° C.

<Preparation of Liquid Nonaqueous Electrolyte>

Lithium hexafluorophosphate ($LiPF_6$) as an electrolyte was dissolved in a mixed solvent of propylene carbonate (PC) and diethyl carbonate (DEC) (volume ratio 30:70) at a concentration of 1.2 mol/L, thereby preparing a liquid nonaqueous electrolyte.

<Making of Nonaqueous Electrolyte Secondary Battery>

The electrode group was housed in a rectangular metal can, the liquid nonaqueous electrolyte was injected therein, and the metal can was sealed with a lid, thereby making a nonaqueous electrolyte secondary battery having a rated capacity of 3.4 Ah.

Comparative Example 2

90% by weight of lithium-manganese oxide ($LiMn_2O_4$) powder and 10% by weight of lithium-cobalt oxide ($LiCoO_2$) powder were provided as positive electrode active materials. A positive electrode was made and a nonaqueous electrolyte secondary battery was obtained in the same manner as in Comparative Example 1, except that the positive electrode active materials, 2% by weight of acetylene black, 2% by weight of graphite, and 3% by weight of polyvinylidene fluoride (PVdF) were added to and mixed with N-methylpyrrolidone (NMP), thereby preparing a slurry.

Comparative Example 3

As positive electrode active materials, 70% by weight of lithium-manganese oxide ($LiMn_2O_4$) powder and 30% by weight of lithium-cobalt oxide ($LiCoO_2$) powder were provided. A positive electrode was made and a nonaqueous electrolyte secondary battery was obtained in the same manner as in Comparative Example 1, except that the positive electrode active materials, 2% by weight of acetylene black, 2% by weight of graphite, and 3% by weight of polyvinylidene fluoride (PVdF) were added to and mixed with N-methylpyrrolidone (NMP), thereby preparing a slurry.

Comparative Example 4

A nonaqueous electrolyte secondary battery was obtained in the same manner as in Comparative Example 1, except that the charge capacity ratio (Qp/Qn) was adjusted to 1.04 by changing the coating thickness of the positive electrode slurry as shown in Table 1.

Example 1

Two batteries which had been adjusted in the same manner as in Comparative Example 1 were provided, and the SOC of one battery A was adjusted to 0%, and the SOC of the other battery B was adjusted to 5%. An electrode group was made in the same manner as in Comparative Example 1, except that the adjusted batteries A and B were decomposed in an argon atmosphere, and the positive electrode taken out from the battery B with an SOC of 5% and the negative electrode taken out from the battery A with an SOC of 0% were used. A nonaqueous electrolyte secondary battery was obtained in the same manner as in Comparative Example 1, except that the electrode group was used.

Example 2

Two batteries which had been adjusted in the same manner as in Comparative Example 2 were provided, and the SOC of one battery C was adjusted to 0%, and the SOC of the other battery D was adjusted to 5%. An electrode group was made in the same manner as in Comparative Example 1, except that the adjusted batteries C and D were decomposed in an argon atmosphere, and the positive electrode taken out from the battery D with an SOC of 5% and the negative electrode taken out from the battery C with an SOC of 0% were used. A nonaqueous electrolyte secondary battery was obtained in the same manner as in Comparative Example 1, except that the electrode group was used.

Example 3

Two batteries which had been adjusted in the same manner as in Comparative Example 3 were provided, and the SOC of one battery E was adjusted to 0%, and the SOC of the other battery F was adjusted to 5%. An electrode group was made in the same manner as in Comparative Example 1, except that the adjusted batteries E and F were decomposed in an argon atmosphere, and the positive electrode taken out from the battery F with an SOC of 5% and the negative electrode taken out from the battery E with an SOC of 0% were used. A nonaqueous electrolyte secondary battery was obtained in the same manner as in Comparative Example 1, except that the electrode group was used.

Example 4

Two batteries which had been adjusted in the same manner as in Comparative Example 1 were provided, and the SOC of one battery G was adjusted to 0%, and the SOC of the other battery H was adjusted to 10%. An electrode group was made in the same manner as in Comparative Example 1, except that the adjusted batteries G and H were decomposed in an argon atmosphere, and the positive electrode taken out from the battery H with an SOC of 10% and the negative electrode taken out from the battery G with an SOC of 0% were used. A nonaqueous electrolyte secondary battery was obtained in the same manner as in Comparative Example 1, except that the electrode group was used.

Example 5

Two batteries which had been adjusted in the same manner as in Comparative Example 2 were provided, and the SOC of one battery I was adjusted to 0%, and the SOC of the other battery J was adjusted to 10%. An electrode group was made in the same manner as in Comparative Example 1, except that the adjusted batteries I and J were decomposed in an argon atmosphere, and the positive electrode taken out from the battery J with an SOC of 10% and the negative electrode taken out from the battery I with an SOC of 0% were used. A nonaqueous electrolyte secondary battery was obtained in the same manner as in Comparative Example 1, except that the electrode group was used.

Example 6

Two batteries which had been adjusted in the same manner as in Comparative Example 3 were provided, and the SOC of one battery K was adjusted to 0%, and the SOC of the other battery L was adjusted to 10%. An electrode group was made in the same manner as in Comparative Example 1, except that the adjusted batteries K and L were decomposed in an argon atmosphere, and the positive electrode taken out from the battery L with an SOC of 10% and the negative electrode taken out from the battery K with an SOC of 0% were used. A nonaqueous electrolyte secondary battery was obtained in the same manner as in Comparative Example 1, except that the electrode group was used.

Example 7

A nonaqueous electrolyte secondary battery was made in the same manner as in Example 1, except that the charge capacity ratio (Qp/Qn) was adjusted to 1.2 by changing the coating thickness of the positive electrode slurry as shown in Table 1.

Example 8

A nonaqueous electrolyte secondary battery was made in the same manner as in Example 2, except that the charge capacity ratio (Qp/Qn) was adjusted to 1.2 by changing the coating thickness of the positive electrode slurry as shown in Table 1.

Example 9

A nonaqueous electrolyte secondary battery was made in the same manner as in Example 3, except that the charge capacity ratio (Qp/Qn) was adjusted to 1.2 by changing the coating thickness of the positive electrode slurry as shown in Table 1.

Example 10

A nonaqueous electrolyte secondary battery was made in the same manner as in Example 4, except that the charge capacity ratio (Qp/Qn) was adjusted to 1.2 by changing the coating thickness of the positive electrode slurry as shown in Table 1.

Example 11

A nonaqueous electrolyte secondary battery was made in the same manner as in Example 5, except that the charge capacity ratio (Qp/Qn) was adjusted to 1.2 by changing the coating thickness of the positive electrode slurry as shown in Table 1.

Example 12

A nonaqueous electrolyte secondary battery was made in the same manner as in Example 6, except that the charge capacity ratio (Qp/Qn) was adjusted to 1.2 by changing the coating thickness of the positive electrode slurry as shown in Table 1.

Example 13

A nonaqueous electrolyte secondary battery was made in the same manner as in Example 1, except that the liquid nonaqueous electrolyte was prepared by dissolving 1.0 mol/L of lithium hexafluorophosphate ($LiPF_6$) and 0.5 mol/L of lithium tetrafluoroborate ($LiBF_4$) as electrolytes in a mixed solvent of propylene carbonate (PC) and diethyl carbonate (DEC) (volume ratio 30:70).

Example 14

51% by weight of lithium-manganese oxide ($LiMn_2O_4$) powder and 49% by weight of lithium-cobalt oxide ($LiCoO_2$) powder were provided as the positive electrode active materials. The positive electrode active material, 2% by weight of acetylene black, 2% by weight of graphite, and 3% by weight of polyvinylidene fluoride (PVdF) were added to and mixed with N-methylpyrrolidone (NMP), thereby preparing a slurry. A positive electrode was made in the same manner as in Comparative Example 1, except that the coating thickness of the positive electrode slurry was changed as shown in Table 1, and a nonaqueous electrolyte secondary battery was obtained.

Two nonaqueous electrolyte secondary batteries thus obtained were provided, and the SOC of one battery was adjusted to 0%, and the SOC of the other battery was adjusted to 5%. An electrode group was made in the same manner as in Comparative Example 1, except that the adjusted batteries were decomposed in an argon atmosphere, and the positive electrode taken out from the battery with an SOC of 5% and the negative electrode taken out from the battery with an SOC of 0% were used. A nonaqueous electrolyte secondary battery was obtained in the same manner as in Comparative Example 1, except that the electrode group was used.

Example 15

A nonaqueous electrolyte secondary battery was made in the same manner as in Example 1, except that the charge capacity ratio (Qp/Qn) was adjusted to 1.3 by changing the coating thickness of the positive electrode slurry as shown in Table 1.

For the examples and comparative examples, the cycle test in the environment at 45° C. were carried out by repeating the cycle including constant current/constant voltage charging at 1 C to 2.8 V, followed by discharge to 1.8 V at 1 C at 50000 times, and constant current overcharge test at 1 C were carried out. The test results are summarized in Table 2. In the results of the overcharge test, when the rupture member was operated during overcharge to SOC 250%, the case was indicated with "Operated", and when the rupture member was not operated, the case was indicated with "Not operated".

Tables 1 and 2 shows the coating thickness of the positive electrode slurry, the coating thickness of the negative electrode slurry, the charge capacity ratio (Qp/Qn) when the charge and discharge range of the positive electrode is from 3.0 to 4.25 V (Li v.s. Li$^+$), and the charge and discharge range of the negative electrode is from 1.4 to 2.0 V (Li v.s. Li$^+$), and the open circuit voltage (OCV) of the positive electrode when the battery was discharged to 1.8 V at 0.2 C in the examples and comparative examples.

The charge capacity Qp of the positive electrode is the charge capacity when the positive electrode is charged from 3.0 V (Li v.s. Li$^+$) to 4.25 V (Li v.s. Li$^+$) at 0.2 C, and is specifically measured by the following method. The area of the positive electrode was the area of the positive electrode active material-containing layer (4 cm$^2$ for the examples) formed on one side of the collector.

Figure 5:
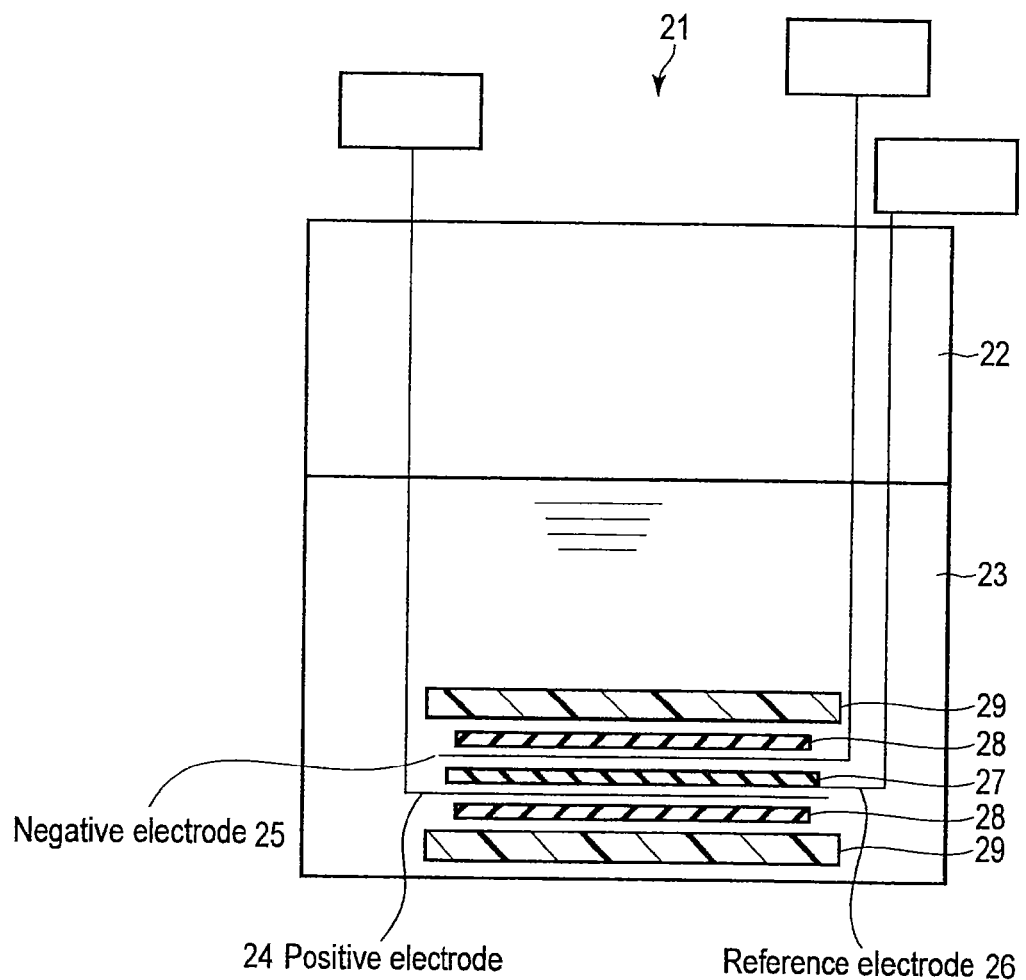
FIG. 5 is a schematic view of the three-pole cell used in the examples.

The three-pole cell shown in FIG. 5 was charged to 4.25 V at a current value of 0.2 C, and then charged for 5 hours at a constant voltage of 4.25 V. The charge capacity thus obtained was recorded as Qp.

The charge capacity Qn of the negative electrode is the value when the negative electrode is charged from 2.0 V (Li v.s. Li$^+$) to 1.4 V (Li v.s. Li$^+$) at 0.2 C, and is specifically measured by the following method. The area of the negative electrode is the area of the negative electrode active material-containing layer formed on one side of the collector (4 cm$^2$ for the examples).

The three-pole cell shown in FIG. 5 was charged to 1.4 V at 0.2 C, and then charged for 5 hours at a constant voltage of 1.4 V. The charge capacity thus obtained was recorded as Qn.

The open circuit voltage (OCV) of the positive electrode when the battery was discharged to 1.8 V at 0.2 C was measured as follows: the three-pole cell shown in FIG. 5 was charged to 2.8 V at a constant current of 1 C, and then charged by constant current/constant voltage charge (CC/CV charge) at a constant voltage of 2.8 V until the current value became 0.05 C. Thereafter, the battery was discharged to 1.8 V at 0.2 C, and allowed to stand for 3 hours in that state. Thereafter, the positive and negative electrodes were separated from the battery in an argon atmosphere, and the potential of the positive electrode taken out was measured.

FIG. 5 shows the three-pole cell used for the measurement of the charge capacities Qp and Qn of the positive and negative electrodes, and the open circuit voltage (OCV) of the positive electrode.

As shown in FIG. 5, a three-pole cell 21 includes a case 22, an electrolytic solution 23 housed in the case 22, a positive electrode 24, a negative electrode 25, and a reference electrode 26. The positive electrode 24, negative electrode 25, and reference electrode 26 are immersed in the electrolytic solution 23. A separator 27 made of cellulose is placed between the positive electrode 24 and negative electrode 25. The reference electrode 26 is inserted between the positive electrode 24 and separator 27. The negative electrode 25, separator 27, reference electrode 26, and positive electrode 24 are sandwiched between two glass filters 28, and polypropylene plates 29 are placed at the outside of the two glass filters 28. The laminate comprising the glass filter 28, negative electrode 25, separator 27, reference electrode 26, positive electrode 24, and glass filter 28 is pressurized by the two polypropylene plates 29. When the charge capacity Qp of the positive electrode and the open circuit voltage (OCV) of the positive electrode are measured, the negative electrode 25 and reference electrode 26 are made of metal lithium. When the charge capacity Qn of the negative electrode is measured, the positive electrode 24 and reference electrode 26 are made of metal lithium.

TABLE 1

|  | Weight ratio of positive electrode active materials (% by weight) LiMn$_2$O$_4$:LiCoO$_2$ | Coating thickness of positive electrode slurry (μm) | Coating thickness of negative electrode slurry (μm) |
| --- | --- | --- | --- |
| Example 1 | 80:20 | 47 | 37 |
| Example 2 | 90:10 | 50 | 37 |
| Example 3 | 70:30 | 45 | 37 |
| Example 4 | 80:20 | 47 | 37 |
| Example 5 | 90:10 | 50 | 37 |
| Example 6 | 70:30 | 45 | 37 |
| Example 7 | 80:20 | 48.5 | 37 |
| Example 8 | 90:10 | 50 | 37 |
| Example 9 | 70:30 | 46 | 37 |
| Example 10 | 80:20 | 48.5 | 37 |
| Example 11 | 90:10 | 50 | 37 |
| Example 12 | 70:30 | 46 | 37 |
| Example 13 | 80:20 | 47 | 37 |
| Example 14 | 51:49 | 41.5 | 37 |
| Example 15 | 80:20 | 53 | 37 |
| Comparative Example 1 | 80:20 | 47 | 37 |
| Comparative Example 2 | 90:10 | 50 | 37 |
| Comparative Example 3 | 70:30 | 45 | 37 |
| Comparative Example 4 | 80:20 | 42 | 37 |

TABLE 2

|  | Qp/Qn | Open circuit voltage of positive electrode (Li v.s. Li$^+$) | 50000 cycle test result | | Overcharge test result |
| --- | --- | --- | --- | --- | --- |
|  |  |  | Capacity retention rate (%) | Resistance increase (%) |  |
| Example 1 | 1.17 | 3.81 | 76 | 156 | Not operated |
| Example 2 | 1.17 | 3.83 | 77 | 177 | Not operated |
| Example 3 | 1.17 | 3.80 | 77 | 152 | Not operated |
| Example 4 | 1.17 | 3.85 | 78 | 150 | Not operated |
| Example 5 | 1.17 | 3.87 | 77 | 168 | Not operated |
| Example 6 | 1.17 | 3.83 | 74 | 153 | Not operated |
| Example 7 | 1.2 | 3.79 | 78 | 153 | Not operated |
| Example 8 | 1.2 | 3.80 | 80 | 161 | Not operated |
| Example 9 | 1.2 | 3.78 | 79 | 159 | Not operated |
| Example 10 | 1.2 | 3.83 | 81 | 158 | Not operated |
| Example 11 | 1.2 | 3.85 | 80 | 158 | Not operated |
| Example 12 | 1.2 | 3.81 | 79 | 151 | Not operated |
| Example 13 | 1.17 | 3.81 | 83 | 155 | Not operated |
| Example 14 | 1.17 | 3.81 | 83 | 148 | Not operated |
| Example 15 | 1.3 | 3.75 | 81 | 150 | Not operated |
| Comparative Example 1 | 1.17 | 3.55 | 68 | 221 | Operated |
| Comparative Example 2 | 1.17 | 3.54 | 70 | 250 | Operated |
| Comparative Example 3 | 1.17 | 3.55 | 71 | 217 | Operated |
| Comparative Example 4 | 1.04 | 3.55 | 61 | 253 | Operated |

Figure 6:
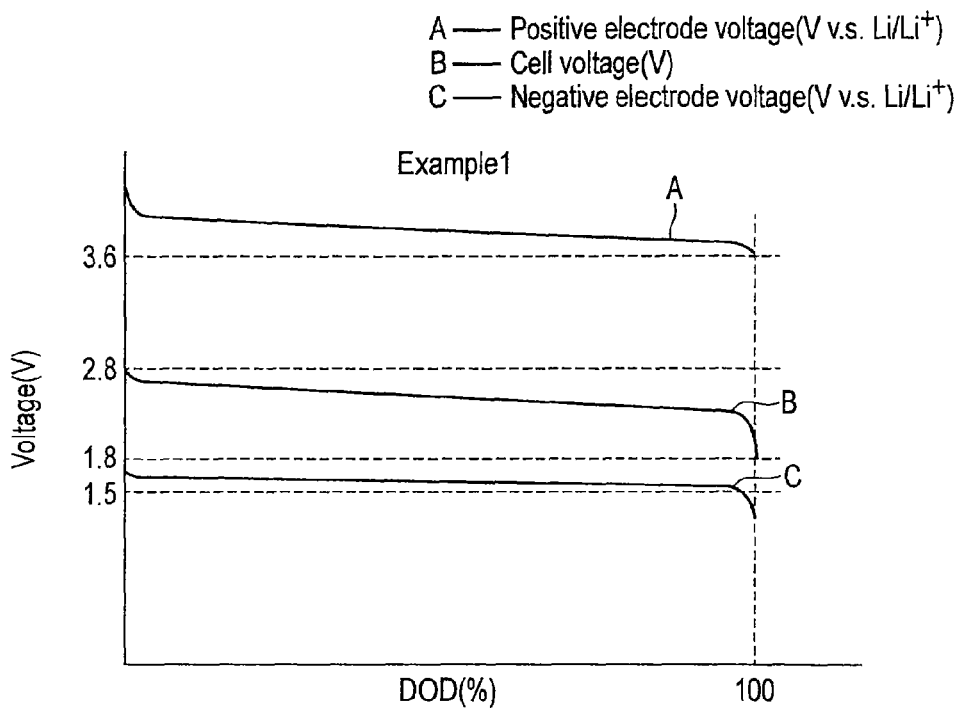
FIG. 6 shows the discharge curves of the voltage of the positive electrode open circuit, voltage of the negative electrode open circuit, and battery voltage of the nonaqueous electrolyte battery of Example 1.
Figure 7:
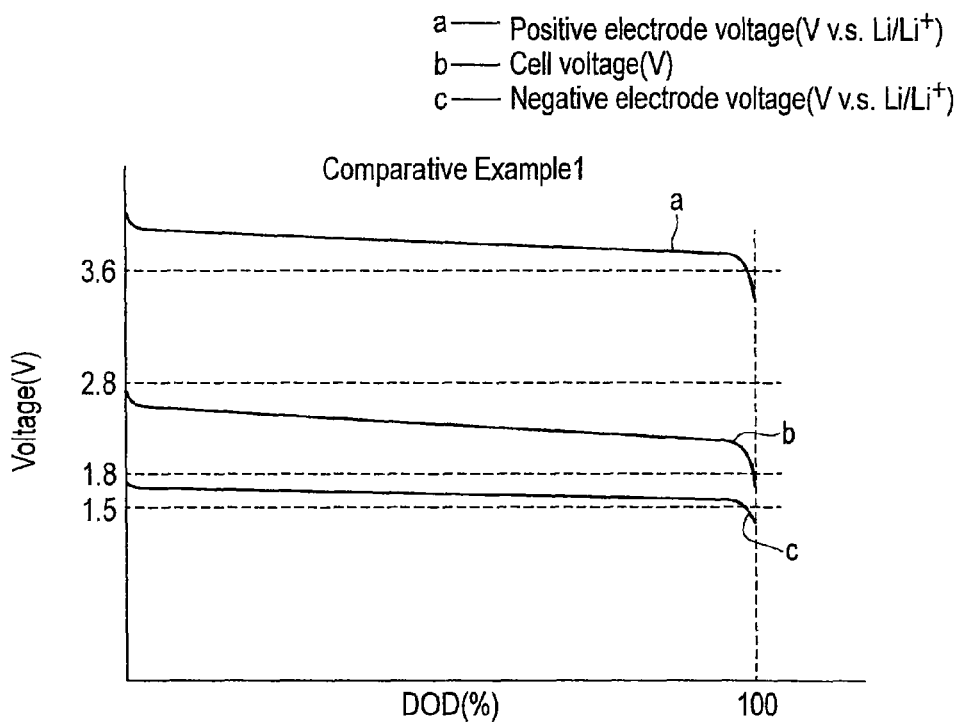
FIG. 7 shows the discharge curves of the voltage of the positive electrode open circuit, voltage of the negative electrode open circuit, and battery voltage of the nonaqueous electrolyte battery of Comparative Example 1.

As is evident from Tables 1 and 2, the batteries of Examples 1 to 15 showed higher capacity retention rates and smaller rates of resistance increase than those of Comparative Examples 1 to 4 after the 50000 cycle test. In the batteries of Examples 1 to 15, at the end of discharge, the negative electrode potential decreases before the positive electrode is overdischarged, whereby the discharge termination voltage is reached, and thus overdischarge of the positive electrode is avoided. On the other hand, in the batteries of Comparative Examples 1 to 4, the decrease in the positive and negative electrode potentials occurs at the same time at the end of discharge, so that the positive electrode is deteriorated by overdischarge. FIG. 6 shows the discharge curves of the OCV of the positive electrode, the OCV of the negative electrode, and the battery voltage when the battery of Example 1 was discharged to 1.8 V at 0.2 C, and FIG. 7 shows the discharge curves of the OCV of the positive electrode, the OCV of the negative electrode, and the battery voltage when the battery of Comparative Example 1 was discharged to 1.8 V at 0.2 C. In FIGS. 6 and 7, DOD represents Depth of Discharge (%). As shown in FIG. 6, in the battery of Example 1, the open circuit voltage of the negative electrode rapidly decreased (discharge curve C) when discharged to 1.8 V at 0.2 C (discharge curve B), but the decrease in the open circuit voltage of the positive electrode was moderate (discharge curve A), so that the end of discharge was determined by the change in the voltage of the negative electrode. On the other hand, in the battery of Comparative Example 1, as shown in FIG. 7, the open circuit voltages of the positive and negative electrodes rapidly decreased almost at the same time as shown by the discharge curves a and c when discharged to 1.8 V at 0.2 C (discharge curve b), so that the end of discharge was determined by the change in the voltages of the positive and negative electrodes.

Also in the overcharge test, the batteries of Examples 1 to 15 did not cause opening of the rupture member, indicating high safety. The reason for this is that, in the examples, the time until the negative electrode voltage reaches 0 V during overcharge can be delayed. On the other hand, in Comparative Examples 1 to 4, the negative electrode voltage approached 0 V during overcharge, and the potential reached the value allowing deposition of Li, so that the rupture member was opened.

The battery according to at least one embodiment and example explained above satisfies the formula (1) ((Qp/Qn)>1.1), and the open circuit voltage (OCV) of the positive electrode is 3.6 V (Li v.s. Li$^+$) or more when the battery is discharged to 1.8 V at 0.2 C, so that the battery having a long life and high safety is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
a positive electrode comprising a lithium-cobalt composite oxide and a lithium-manganese composite oxide wherein the lithium-manganese composite oxide is present in an amount greater than 50% by weight based on the total weight of the lithium-cobalt composite oxide and the lithium-manganese composite oxide,
a negative electrode comprising a lithium titanium composite oxide, and
a nonaqueous electrolyte,
wherein:
the battery satisfies the following formula (1), and an open circuit voltage of the positive electrode being 3.6 V (Li v.s. Li$^+$) or more when the battery is discharged to 1.8 V at 0.2 C:

$$(Qp/Qn) > 1.1 \tag{1}$$

wherein Qp is a charge capacity (mAh/m$^2$) of the positive electrode per unit area, Qn is a charge capacity (mAh/m$^2$) of the negative electrode per unit area, and
a charge and discharge range of the positive electrode is from 3.0 to 4.25 V (Li v.s. Li$^+$), and a charge and discharge range of the negative electrode is from 1.4 to 2.0 V (Li v.s. Li$^+$).

2. The battery of claim 1, wherein the open circuit voltage of the positive electrode is 3.6 V (Li v.s. Li$^+$) or more and 3.9 V (Li v.s. Li$^+$) or less.

3. The battery of claim 2, wherein the (Qp/Qn) value satisfies the following formula (2):

$$1.7 \geq (Qp/Qn) > 1.1 \tag{2}$$

4. The battery of claim 1, wherein the (Qp/Qn) value satisfies the following formula (2):

$$1.7 \geq (Qp/Qn) > 1.1 \tag{2}$$

5. The battery of claim 1, wherein the lithium-cobalt composite oxide is expressed by $Li_xCoO_2$ ($0<x\leq1.1$), and the lithium-manganese composite oxide is expressed by $Li_xMn_2O_4$ ($0<x\leq1.1$) or $Li_xMnO_2$ ($0<x\leq1.1$).

6. The battery of claim 5, wherein:
the open circuit voltage of the positive electrode is 3.6 V (Li v.s. Li$^+$) or more and 3.9 V (Li v.s. L$^+$) or less, and
the (Qp/Qn) value satisfies the following formula (2):

$$1.7 \geq (Qp/Qn) > 1.1 \tag{2}$$

7. The battery of claim 1, wherein the lithium-manganese composite oxide is present in an amount of at least 80% by weight based on the total weight of the lithium-cobalt composite oxide and the lithium-manganese composite oxide.

8. The battery of claim 7, wherein:
the open circuit voltage of the positive electrode is 3.6 V (Li v.s. Li$^+$) or more and 3.9 V (Li v.s. Li$^+$) or less, and
the (Qp/Qn) value satisfies the following formula (2):

$$1.7 \geq (Qp/Qn) > 1.1 \tag{2}$$

9. The battery of claim 1, wherein the amount of the lithium-manganese composite oxide is from 70 to 99% by weight, and an amount of the lithium-cobalt composite oxide is from 1 to 30% by weight, based on the total weight of the lithium-cobalt composite oxide and the lithium-manganese composite oxide.

10. The battery of claim 9, wherein:
the open circuit voltage of the positive electrode is 3.6 V (Li v.s. Li$^+$) or more and 3.9 V (Li v.s. Li$^+$) or less, and
the (Qp/Qn) value satisfies the following formula (2):

$$1.7 \geq (Qp/Qn) > 1.1 \tag{2}$$

11. The battery of claim 1, wherein the lithium titanium composite oxide comprises at least one of spinel lithium titanate and ramsdellite lithium titanate.

12. The battery of claim 11, wherein:
the open circuit voltage of the positive electrode is 3.6 V (Li v.s. Li$^+$) or more and 3.9 V (Li v.s. Li$^+$) or less, and
the (Qp/Qn) value satisfies the following formula (2):

$$1.7 \geq (Qp/Qn) > 1.1 \tag{2}$$

* * * * *